Patented June 13, 1950

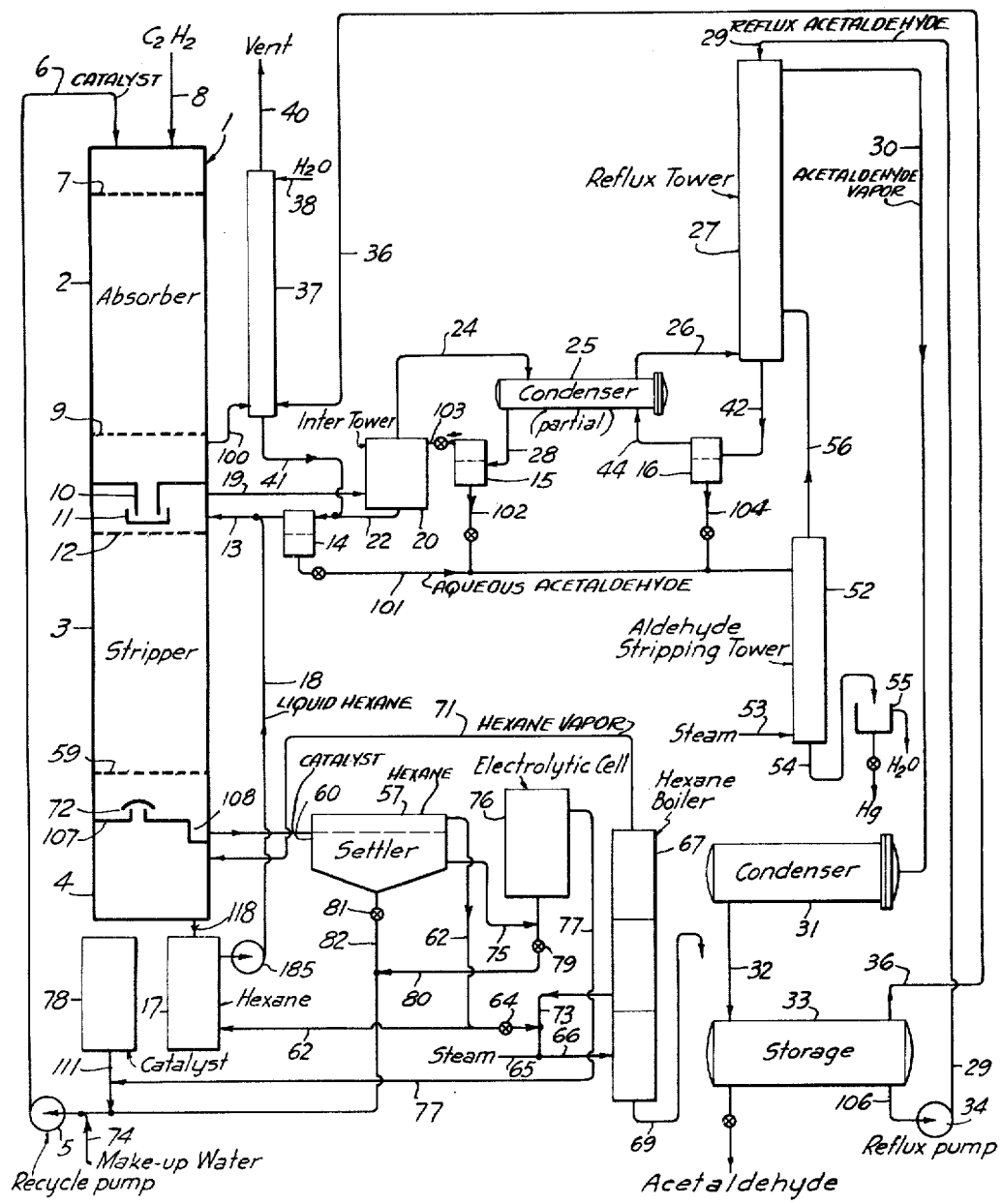
FIG_1_

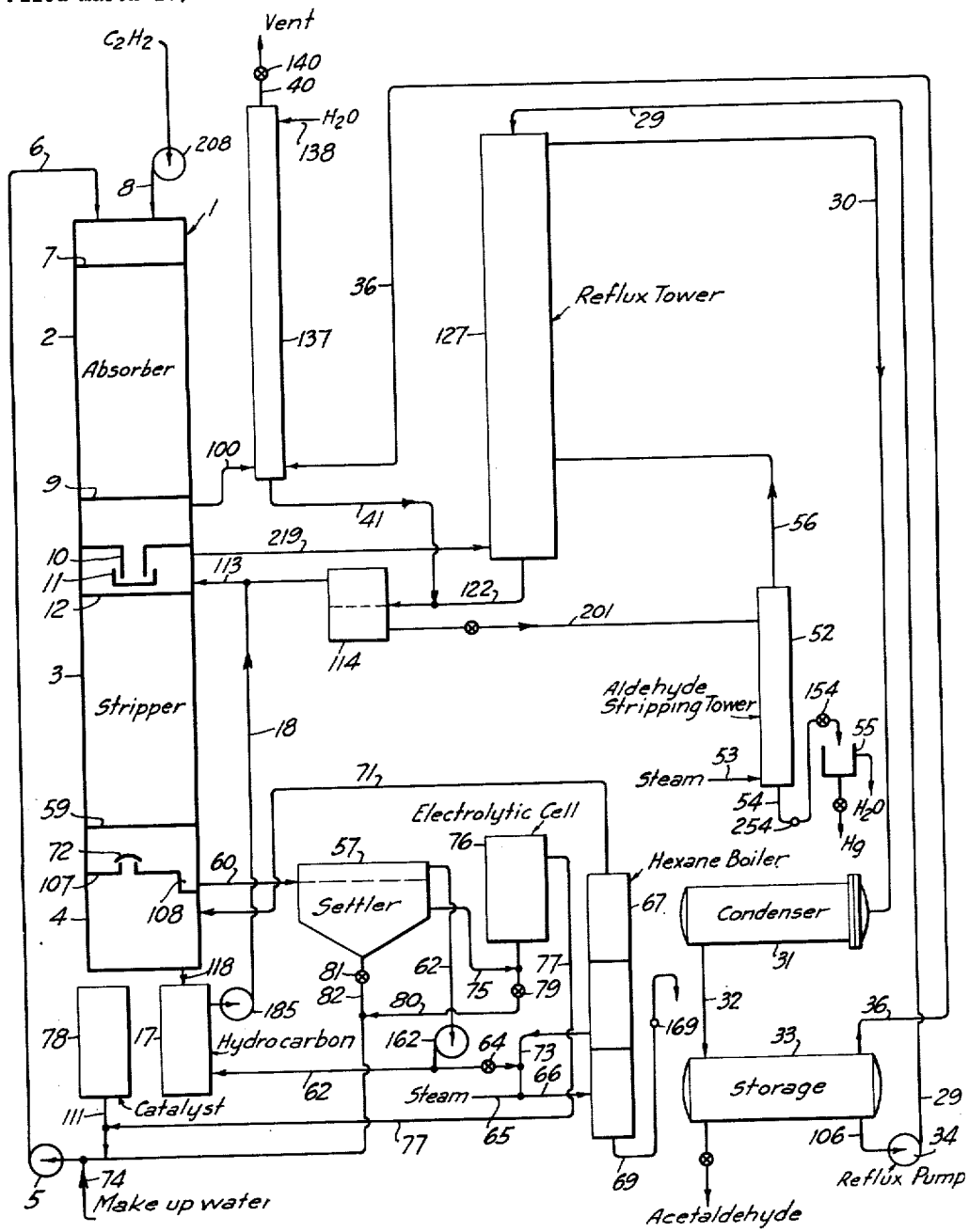
FIG_2

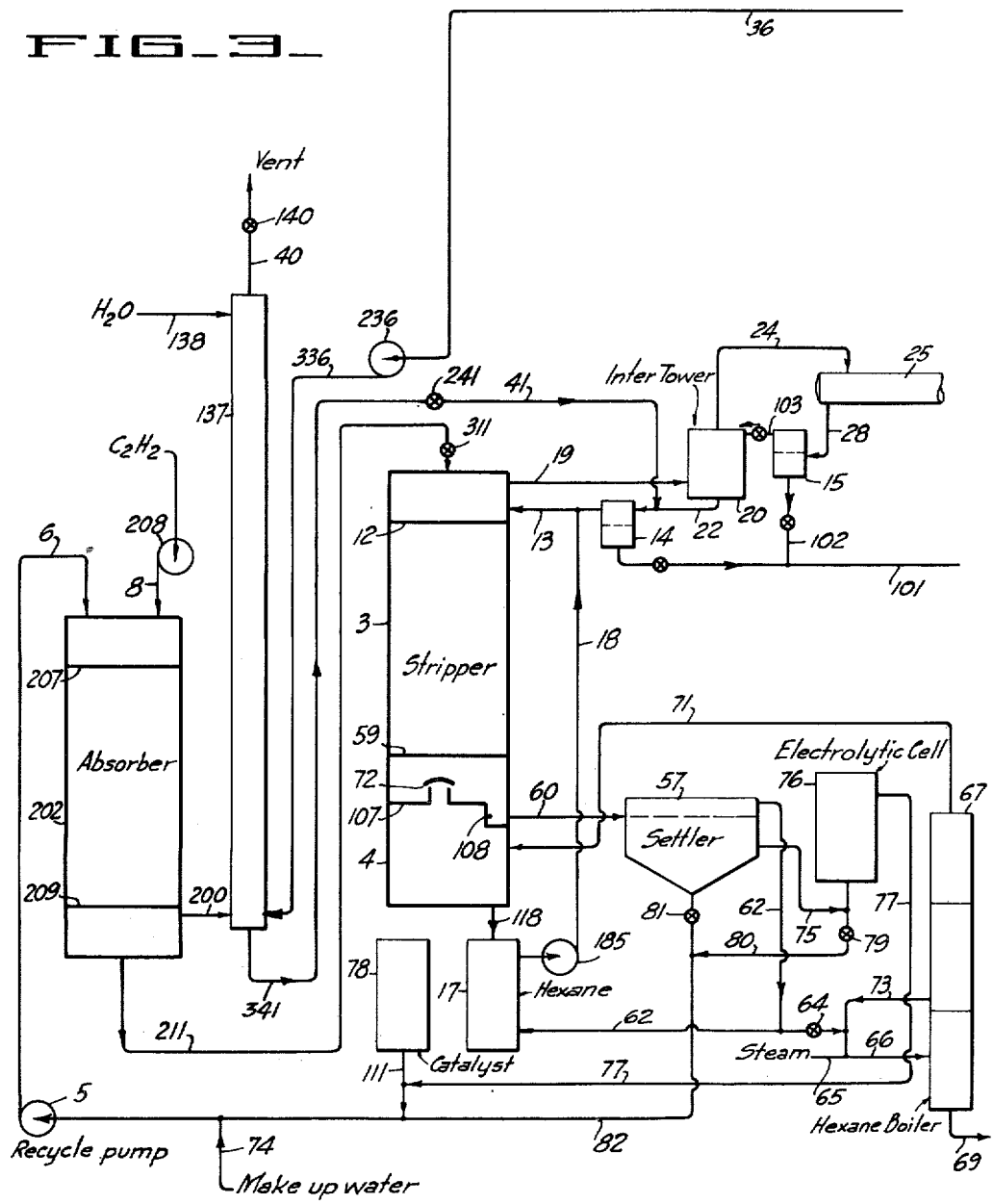

2,511,787

UNITED STATES PATENT OFFICE 2,511,787

MANUFACTURE OF ACETALDEHYDE

Merle Randall, Berkeley, Calif.

Application March 17, 1947, Serial No. 735,109

9 Claims. (Cl. 260—605)

This invention relates to a process for reacting acetylene with water in the presence of a liquid catalyst solution to produce acetaldehyde.

The hydration of acetylene to form acetaldehyde proceeds in the presence of a proper catalyst in accordance with the reaction:

$$HC{\equiv}CH + HOH \rightarrow CH_3CHO$$

This reaction is highly exothermic. The catalyst usually employed is a solution of mercuric sulphate in sulphuric acid. It has been recognized heretofore that if the acetaldehyde is permitted to remain in contact with the catalyst solution, the acetaldehyde will condense or polymerize to form resin-like products; the tendency towards resin formation is enhanced by such factors as an increase in the concentration of the sulphuric acid, the concentration of the aldehyde in the catalyst solution and by continued retention of the aldehyde in the solution. For this reason, it is desirable to maintain the catalyst solution in contact with the acetylene at a temperature most favorable to the hydration of the acetylene but below that temperature range whereat the acetaldehyde polymerizes rapidly to form a resin-like product. In addition, it is desirable to remove the acetaldehyde from the catalyst solution as rapidly as the acetaldehyde is formed.

While it has been proposed heretofore to remove the acetaldehyde from the catalyst solution with a solvent therefor or with a stream of acetylene, this does not enable the temperature of the catalyst solution to be maintained within the desired temperature range without introducing numerous and expensive complications in the process. The utilization of excess acetylene presents other and different problems, e. g., the acetylene being relatively expensive, must be separated and recovered, a difficult and expensive operation. I have found that both process controls, that is, removal of the acetaldehyde and the temperature control, can be established and successfully practiced if one introduces into the catalyst solution sufficient liquid hexane to cool the catalyst solution in contact with the acetaldehyde and, simultaneously, to remove from the catalyst the acetaldehyde present. The liquid hexane of commerce usually has an azeotropic boiling point with water slightly below the boiling point of sulphuric acid catalyst-aldehyde solution leaving the acetylene-water reaction zone. By introducing the liquid hexane into the catalyst-aldehyde solution, one can maintain the temperature of the catalyst solution within the desired temperature range and, at the same time, sweep out of the solution the acetaldehyde present so that the catalyst solution is substantially completely stripped. Thereafter, the hexane and acetaldehyde can be separated in a relatively simple manner. The hexane need not be a pure hexane isomer and one can use a mixture of isomers or any hydrocarbon having approximately the boiling properties of the mixed hexanes of commerce. A suitable mixed hexane has the following Engler distillation characteristics:

| Percent Distilled | T° C. |
| --- | --- |
| Initial | 63.5 |
| 10 | 64.9 |
| 25 | 65.3 |
| 50 | 66.0 |
| 75 | 66.9 |
| 90 | 67.8 |
| End Point | 69.9 |

In place of hexane one can use any volatile liquid having an azeotropic boiling point with water below but close to that of the catalyst solution at the pressure of operation and inert to and substantially immiscible with each of the components present in the solution.

The use of hexane is also advantageous in that it enables that small quantity of resinous material formed and acetaldehyde condensation products to be removed from the catalyst and ultimately eliminated from the system. It is known that various side reactions take place in the process of hydrating acetylene to form acetaldehyde which result in precipitation of an inactive grey sludge consisting chiefly of finely divided metallic mercury mixed with insoluble mercury organic compounds and sometimes tarry condensation products. The amount of this material formed bears no stoichiometric relation to the quantity of acetaldehyde produced. It varies greatly under different conditions. By utilizing hexane, I am able to remove these from the catalyst and ultimately from the system.

While I have mentioned the use of a sulphuric acid-mercury catalyst, the various catalysts known to be useful in this reaction can be utilized, such as benzene sulphonic acid, phosphoric acid, sodium acid sulphate, or other suitable acids. Likewise, ferric and ferrous sulphate or a mixture of iron sulphate with cobalt, nickel, or manganese, or chromium, or vanadium, or molybdenum, or cerium sulphate, or mixtures of these with one another or with iron sulphate can be employed. However, I prefer to use the sulphuric acid-iron sulphate solution containing soluble mercury because I have found that with this catalyst, very little resin is formed and the formation of objectionable side products usually associated with the hydration of acetylene in the presence of an acid-mercury catalyst is kept to a minimum, while from 95-99% of the acetylene introduced into the operation is converted into aldehyde. I prefer to work with a soluble mercury content in the catalyst of from 0.001 to 4% and with an iron sulphate content of some 2-10% and a sulphuric acid strength of from 5-25%. I have also found that the ferric iron content is preferably kept above 50% of the total iron content, but that it is unnecessary, and in fact undesirable, to maintain the iron entirely in the ferric condition. In general, the higher the ferric-ferrous ratio, the more rapidly is the mercury sludge redissolved and the smaller is the rate of production of this sludge.

It is in general the broad object of the present invention to provide an improved practice for the hydration of acetylene to form acetaldehyde.

Another object of the present invention is to provide a continuous process for the production of acetaldehyde from acetylene.

Another object of the present invention is to provide a process for the hydration of acetylene to form acetaldehyde, and in which the formation of aldehyde-resin or other condensation products of acetaldehyde is obviated or maintained at a minimum.

In the utilization of the sulphuric acid-mercury catalyst, it is known that the mercuric sulphate or mercuric sulphate complex, the form in which the mercury is present in the sulphuric acid solution, will remain in solution if ferric ion is present, or some equivalent ion such as the chromic, vanadic, manganic, ceric or cupric. However, as the catalyst is used, the ferric ion is gradually reduced to ferrous ion and, as this occurs, the efficiency of the catalyst is rapidly lowered. Usually, a portion of the catalyst is removed and subjected to oxidation in an electrolytic cell to oxidize the ferrous or other-ous ion present in the catalyst to maintain the catalyst's efficiency as a sulphuric acid solution of mercuric sulphate. In accordance with this invention, a continuous process is provided in which all or a portion of the catalyst is continually subject to oxidation in an electrolytic cell, the aldehyde resin and other condensation products are removed and the continuously regenerated catalyst is returned for reuse in the system.

An additional object of the present invention is to provide a continuous process for the manufacture of acetaldehyde, by the hydration of acetylene in which the catalyst solution is maintained of such composition that a relatively high efficiency in the hydration of acetylene is attained.

The invention includes other objects and features of advantage, some of which, together with the foregoing, will appear hereinafter wherein the present preferred form of process for practicing the present invention is set forth in conjunction with Figures 1, 2 and 3 in the drawings which accompany and form a part hereof and which are each a diagram of a suitable apparatus assembly and a flow sheet which can be employed to practice the invention and wherein like parts or units are similarly identified.

Referring particularly to Figure 1 in the drawings, a tower 1 is included and which is made up in three sections, an upper or absorbing section 2, a middle or stripper section 3 and a lower or storage section 4. The tower is conveniently constructed of a high silicon cast iron, of 18 chromium-nickel stainless steel or other suitable material. The absorber section 2 includes a distributor plate 7 positioned at the top of suitable packing such as porcelain, high silicon cast iron or other suitable materials fashioned in the form of Raschig rings or berl saddles and supported by screen plate 9. The absorber 2 drains into the stripper 3 through down spout 10; a cup 11 positioned about the down spout provides a liquid seal between the stripper and absorber. Stripper 3 includes a distributor plate 12 and a screen support plate 59 upon which a packing material is supported such as the aforementioned rings or saddles. Liquid collecting in the base of the stripper passes through pipe 60 to settler 57.

The bottom of the absorber below support plate 9 is connected by pipe 100 to scrubbing column 37 into which water is introduced through line 38. Any gaseous products are taken off at the top of the column through line 40 and are either vented to the atmosphere or are sent to a suitable acetylene recovery plant. Vapors from aldehyde storage vessel 33 are also introduced into the bottom of the scrubbing column 37 through pipe 36. The bottom of the scrubbing column 37 is connected by pipe 41 to pipe 22 which leads from inter-tower 20 to separating vessel 14. The upper portion of stripper 3 is connected by pipe 19 to the bottom of the inter-tower 20. Products collecting at the top of the separator 14 are delivered through pipe 13 into the upper portion of stripper 3 above the distributor plate 12 while the bottom portion of the products collecting in vessel 14 are taken off through pipe 101 and are delivered to the aldehyde stripping tower 52. Gaseous products from the top of the inter-tower 20 are delivered from line 24 to the partial condenser 25. Liquefied products from the partial condenser 25 are delivered through pipe 28 to separator 15 and thence the heavy or aqueous layer is sent through pipe 102 into pipe 101 for passage to the aldehyde stripping tower 52, while the hexane layer separating in separator 15 is returned to the inter-tower 20 through line 103.

Gaseous products passing out of the partial condenser 25 are delivered through pipe 26 to the reflux tower 27, the liquefied products from which are returned through pipe 42 to separator 16, the hexane layer being returned through pipe 44 to the partial condenser 25 while the aqueous layer collected in the separator 16 is delivered by pipe 104 to pipe 101 and thence to the aldehyde stripping tower 52. Steam is introduced through pipe 53 into the bottom of the stripping tower, any mercury and water collecting in the tower being taken off through line 54 and collected in vessel 55. The material vaporized in the stripping tower 52 is delivered through pipe 56 into the reflux tower 27.

Separators 14, 15 and 16, and the aldehyde tower 52, may be omitted but, in this case, the operation is not as satisfactory. If the separators and stripping tower are omitted, fluids in pipe 22 are delivered directly through pipe 13 to distributor plate 12; those in pipe 28 are delivered through pipe 103 to the top of the inter-tower 20; and those in pipe 62 are delivered directly through pipe 44 to the partial condenser, suitable hydraulic seals being provided in each instance.

Gaseous material reaching the top of the reflux tower 27 is taken off through pipe 30 and delivered to condenser 31 from which the liquefied product is delivered through line 32 into the aldehyde storage tank 33. A portion of the aldehyde is removed from the storage tank through line 106 and is returned through line 29 by pump 34 to the top of the reflux tower 27. Any vapors from the storage tank are taken off through line pipe 36 and, as before mentioned, returned to the bottom of the vent scrubbing tower 37.

Liquid material reaching plate 107 is collected in the pocket 108 and is taken off from this through pipe 60 into a settling vessel 57. Material settling to the bottom of the settler is taken off through pipe 82 under the control of valve 81 and is delivered to the intake of the recycle pump 5. A pipe 62 provided adjacent the top of the settler 57 is connected to the hexane receiver 17 and to valve 64 and to pipe 73 which is in turn connected to steam jet 65 for jetting material and steam into the bottom of hexane boiler 67. A second pipe 75 is connected to the settler 57 at an intermediate elevation, one lower than the interface between the two layers, this pipe leading to electrolytic cell 76 when valve 79 is closed. The cell can be of any suitable construction for oxidizing the ferrous iron present to the ferric state, for example. The regenerated catalyst from the electrolytic cell is taken off through line 77 and is returned to the catalyst storage tank 78. Pipe 82 is connected by pipe 80 and valve 79 to the bottom of the cell so that sediment collecting in the bottom of the cell can be removed and sent to the intake of recycle pump 5, if this mode of operation is desired. Catalyst removed from storage tank 78 by pump 5 through line 111 is delivered by pump 5 through line 6 to the top of the absorber 2 to which acetylene is also delivered through line 8.

In the hexane boiler, the hexane and heavy resinous condensation products, if any, are separated, the hexane containing stream being sent overhead through pipe 71 while the heavy materials are taken off through pipe 69. Make-up hexane is stored in hexane storage tank 17 from which it can be removed by pump 185, being delivered through pipe 18 to inlet pipe 13 which as will be recalled is connected to the top of stripper 3 above distributor plate 12. Pipe 118 connects the hexane storage tank 17 with the tower or storage section 4.

In operation, a suitable catalyst which may be the previously mentioned sulphuric acid solution of mercuric sulphate containing iron sulphates, is delivered by pump 5 and pipe 6 to distributor plate 7 at the top of the absorber 2, the catalyst entering the tower at a temperature of approximately 60° C. I prefer to have the catalyst enter the tower at a temperature of 50°–80° C. and to hold the temperature rise to not over 10° C. within the absorbing section. Slightly lower or slightly higher entrance temperatures for the catalyst may be used but in no case should the temperature at the base of the absorber 2 exceed the boiling point of the catalyst mixture containing aldehyde. The temperature rise in the absorber is controlled by the rate of circulation of the catalyst in line 6; the temperature rise of the catalyst depending upon the activity of the catalyst and the amount of catalyst circulation.

At the same time, suitably purified acetylene is introduced through inlet pipe 8, the acetylene being added under pressure of approximately six inches of water pressure above atmospheric pressure. The acetylene is absorbed by the catalyst solution as the latter flows downwardly over the packing in absorber 2, the solution passing through the support plate 9 into the lower section of the absorber and thence through the seal provided by cup 11 to the distributor plate 12 in stripping section 3. During the absorption, there is a rise in temperature of the catalyst. Heat is removed from the circulating catalyst by the hexane introduced through pipe 13 from the overflow of separator 14, and by pump 185 through line 18. The hexane so derived and introduced through pipe 13 mixes with the aldehyde charged catalyst. As a result, a mixture of aldehyde, water and hexane is vaporized while the catalyst solution is cooled to the boiling point of the immiscible phases present. The vaporized mixture, consisting of aldehyde, hexane and water, passes through pipe 19 to the inter-tower 20 which is either filled with packing or else contains a suitable number of plates. In the inter-tower, the vaporized mixture comes into contact with a descending stream of hexane containing some aldehyde and derived as the upper layer from separator 15. A portion of the water present in the vapor introduced into the inter-tower 20 separates out as a consequence and, along with liquid hexane containing some aldehyde, is withdrawn through pipe 22 to the separator 14 wherein the water and hexane separate, the hexane passing back through pipe 13 to the stripper 3 while the water is taken off through pipe 101 and sent to the aldehyde stripping tower 52.

The moist hexane aldehyde water vapor leaving the top of the inter-tower 20 through pipe 24 passes to the partial condenser 25 wherein it is cooled, the vapor passing out of the partial condenser through pipe 26 to the bottom of the reflux tower 27. The two-phase condensate derived from the partial condenser 25 is removed through pipe 28 to the separator 15 wherein the hexane and water separate, as has been previously described, the water-aldehyde phase being taken off through pipe 102 and sent to the aldehyde stripping tower 52.

A reflux of substantially pure aldehyde is introduced into the reflux tower 27 through pipe 29 from the aldehyde storage 33. Substantially pure aldehyde vapor is taken off through pipe 30 and is sent to the condenser 31. Vapors from the aldehyde storage tank 33 are taken off through pipe 36 to the bottom of vent tower 37 wherein, together with vapors taken off at the bottom of the absorber 2, the vapors are washed with a descending stream of cold water, the resulting water aldehyde solution being sent to separator 14.

The gases leaving the vent tower 37 may contain a very small percentage of acetylene which may be wasted or sent to an acetylene recovery system. Although ordinarily hexane does not reach the absorber section, the vent provided by pipe 100 at the base of the absorber 2 serves to remove any small quantity of hexane which may reach the absorber section, and which can interfere with the hydration reaction. The aqueous solution of aldehyde and immiscible condensed hexane is removed from the bottom of the tower 37 through pipe 41 and is returned to the separator 14.

As previously mentioned, the aqueous layers from the bottoms of separators 14, 15 and 16 are led through pipe 101, 102 and 103 to the aldehyde stripping tower 52 wherein the aldehyde present is stripped from the water with live steam, the aldehyde being returned to the tower 27 while the water and any mercury present are taken off at the bottom of the stripping tower through pipe 54, to separator 55 wherein the mercury and water are separated.

The catalyst stream descending through the stripper 3 is taken off the base of the stripper through pipe 60 and is sent to settler 57 wherein it separates into an upper or a hexane layer and a lower or catalyst layer. The hexane is taken off through pipe 62 and is sent through pipe 62 to the receiver 17. A portion of the hexane is sent to the steam jet 65 to be introduced into the bottom of the hexane boiler 67. An aqueous layer forms in the bottom of the hexane boiler while any resins or non-volatile compounds dissolved out of the catalyst by the hexane also collect with the water in the bottom of the hexane boiler. These are withdrawn together with the water through the goose-neck overflow 69. Ordinarily the water used in the process is introduced as water vapor with hexane in line 71; make-up water may be added through line 74 to the intake of the catalyst recycle pump 5 from pipe 64.

The hexane vapor escaping from the top of the boiler 67 passes overhead through the pipe 71 and into the bottom of the stripper 3 from which it passes upwardly into the stripper proper through the bubble cap 72. The ascending hexane vapor serves to strip aldehyde present not vaporized with the liquid hexane introduced through pipe 13. The operation of the hexane boiler may also be aided by circulating some liquid hexane from an intermediate hexane layer in the boiler through pipe 73 to the steam jet 65.

Clear catalyst liquid from an intermediate portion of the settler 57 is taken off through line 75 to the electrolytic cell 76 wherein ferrous ion is converted to ferric ion and some of the organic matter in the catalyst may be oxidized. The regenerated catalyst is taken off through line 77 to line 111 and is returned to the catalyst storage 78. Any sediment collecting at the bottom of the cell 76 is withdrawn through valve 79 and pipe 80 for transference to the catalyst recycle pump 5. The sediment and mercury are reconverted, through the action of the ferric ion, aldehyde and acetylene, into active catalyst on the surface of packing on absorber 2 and stripper 3. I have found that when the metallic mercury sludge, consisting of finely divided metallic mercury and insoluble mercury compounds, is added to the recycled catalyst stream, the soluble mercury content of the catalyst stream is raised and the activity of the catalyst is increased.

In a typical operation, 2000 ml. per minute of a catalyst solution was circulated through the absorber. The catalyst solution contained approximately 15% sulphuric acid, 12% iron sulphate and 0.4% mercury sulphate; the ferric iron content varied between 50% and 75% of the total iron present. Acetylene was introduced continuously, approximately 8000 ml. being absorbed per minute. The catalyst solution containing acetaldehyde was stripped in the stripper utilizing a hexane, boiling at about 155° F. The acetaldehyde yield was 99.0 to 99.5% of the acetylene introduced. The mercury concentration in the catalyst was maintained by the electrolytic cell; a negligible quantity of side reaction products were discarded with the effluent from the hexane boiler.

The process of my invention may also be operated as is shown in Figure 2, at atmospheric pressure when refrigeration is available, or, when it is desired to use the process under super atmospheric pressure in both the absorbing and stripping sections, with usual cooling water.

An essential difference between the apparatus and flow sheet shown in Figures 1 and 2 is in the elimination of the inter-tower 20 and partial condenser 25 and the utilization of pumps, pressure reducing and control valves, as will be apparent to those skilled in the art, in connection with the process operation shown in Figure 2.

When a pressure above atmospheric pressure is used, the settler 57 and electrolytic cell 76 are operated under atmospheric pressure, while the absorber 2, stripper 3, hexane boiler 67, reflux tower 27, aldehyde stripping tower 52, condenser 31, storage tank 33 and vent gas stripping tower 37, are each operated under the super-atmospheric pressure. In this case, a pressure reducing valve is included in line 60 to the settler so that the settler and electrolytic cell are operated at atmospheric pressure; the liquid layer taken off the settler through pipe 62 is introduced by pump 162 into the storage tank 17 or into the hexane boiler 67.

Acetylene is introduced under pressure through pipe 8 by pump 208. The vapors from the top of the stripping section 3 are carried by pipe 219 to the bottom of the reflux tower 127, while the liquid reflux from the bottom of the reflux tower 127 is drawn through the pipe 122 to the separator 114. The upper layer in separator 114 is returned to the stripping section through pipe 113; the lower aqueous layer is drawn through pipe 201 to the upper part of the aldehyde stripping tower 52. The liquid from the bottom of the aldehyde stripping tower 52 is drawn through the reducing valve 254. Any fixed gases along with accompanying acetylene, acetaldehyde, hexane and water vapors are released through the vent washing tower 137 and escape to the atmosphere through reducing valve 140.

A super atmospheric pressure in the absorbing tower is of advantage because of the increased partial pressure of acetylene which is then made possible. I prefer to have the temperature of absorption and of the catalyst the same as those previously described and to recycle sufficient catalyst to hold the temperature rise in the absorber to about 10°, although a greater increase can be used. As the hydrocarbon to be used in the stripper, one should employ a hydrocarbon having a greater volatility than hexane for the stripping agent. For example, when the pressure in the absorbing tower is about 35 pounds gauge and the azeotropic temperature of the vapors leaving by pipe 219 is substantially the same as that of the catalyst entering by pipe 6, one can employ pentane as the hydrocarbon.

The simplified arrangement of Figure 2 can also be used at atmospheric pressure without the pressure reducing valves, if sufficient refrigerating fluid is available to condense the aldehyde in condenser 31; this requires that the heat of reaction be removed at the temperature of boiling, pure aldehyde. The apparatus and flow sheet of Figure 1 is advantageous in that the greater part of the heat of the reaction is removed in the partial condenser with water at temperatures at which water is ordinarily available naturally or which can be attained through the use of cooling towers.

In the modification of the process and apparatus shown in Figure 3, recycle catalyst is delivered to the top of screen plate 207 of absorber 202, at approximately 60° C. the absorber being packed as is absorber 2, in Figure 1. Acetylene, under superatmospheric pressure produced by a blower 208, is introduced through pipe 8, the acetylene being absorbed and, with the catalyst solution and aldehyde, flowing downward through screen plate 209, out through pipe 211 and through reducing valve 311 into the stripper 3. The stripper in Figure 3 is identical with the one previously described in Figure 1, the pressure on the stripper being atmospheric. The vent gas from the absorber is taken through pipe 200 to the bottom of scrubbing tower 137, where it is scrubbed with cold water introduced through pipe 138, under pressure. The vent gases from the aldehyde storage tank are led through pipe 36 and pump 236 to the bottom of the vent tower through 336. The liquid from the bottom of the scrubbing tower is led through pipe 341 and reducing valve 241 to the separating tank 14 which functions as that described in Figure 1. The remainder of the apparatus shown in Figure 3 is identical with that shown in Figure 1 and functions in a like manner.

The temperature of the recycle catalyst delivered to the top of the absorber is limited to that temperature which, when increased due to the hydration of the acetylene, will be such that the vapor pressure of the water and acetaldehyde from the catalyst is less than the total pressure at which the absorber is operated. These partial pressures, plus the partial pressure of the acetylene and that of any hexane which may inadvertently be present, equals the total pressure. Since absorption depends upon there being a partial pressure of acetylene, the operation of the absorber requires that the pressure in the absorber be increased as the temperature of the recycle catalyst is increased.

The advantage of the arrangement shown in Figure 3 is that a greater rate of absorption and a greater difference in temperature between the top and bottom of the absorber can be attained with the same catalyst. A greater difference in temperature between the top and bottom of the absorber represents a greater production of aldehyde per unit volume of catalyst circulated and therefore represents a smaller load upon the electrolytic cell; also, less hexane need be drawn to the hexane boiler to maintain the catalyst.

I claim:

1. A process for producing acetaldehyde which comprises simultaneously and continuously introducing acetylene and an aqueous catalyst solution into a reaction zone, said catalyst solution being at a temperature in the range of about 50° C. to about 80° C. in an amount substantially in excess of that required to promote the reaction and sufficient to prevent a temperature rise of said solution during passage through said zone of more than about 10° C. above that at which it was introduced, substantially completely reacting said acetylene in said reaction zone without vaporizing the acetaldehyde formed, and continuously removing aqueous catalyst solution and acetaldehyde from said zone, recovering the acetaldehyde from the hot solution, regenerating and recycling the catalyst to the reaction zone.

2. The process of claim 1 wherein the catalyst solution and acetylene are introduced adjacent the top of said reaction zone, passed concurrently downwardly therethrough and the catalyst solution and dissolved acetaldehyde withdrawn at a point downstream from the point of introduction.

3. The process of claim 1 wherein the catalyst solution contains 5–25% $H_2SO_4$, 0.001–4% of a mercury compound, and 2–10% iron sulfate, at least half of the iron being in the ferric state.

4. A continuous process for producing acetaldehyde which comprises the steps of simultaneously and continuously introducing acetylene and an aqueous catalyst solution containing an oxidizing agent into a reaction zone, passing the mixture concurrently through said zone, the temperature of said solution initially being in the range about 50° C. to about 80° C. and the amount substantially in excess of that required to promote the reaction and sufficient to prevent an increase in temperature of more than about 10° C. above the initial temperature of the solution, reacting the acetylene substantially completely, continuously removing the catalyst solution and reaction products containing acetaldehyde from said reaction zone, recovering the acetaldehyde, and regenerating and recycling the catalyst solution.

5. A process which comprises introducing acetylene and, simultaneously, a catalyst solution into one end of a reaction zone, said solution being at a temperature of about 50° C. to about 80° C., substantially completely hydrating the acetylene in said zone to acetaldehyde, the proportion of catalyst solution being substantially in excess of that required to promote the reaction and sufficient to prevent substantial vaporization in the reaction zone of the acetaldehyde formed and to maintain the temperature at the outlet of the zone below the boiling point of the catalyst solution containing said acetaldehyde dissolved therein, the proportion of catalyst solution charged being the principal means of temperature control, removing the hot catalyst solution containing said acetaldehyde dissolved therein from the other end of said zone, at a higher temperature than that of the catalyst solution charged, but below the boiling point of said catalyst-aldehyde solution, recovering the acetaldehyde from the hot last named solution, and regenerating and recycling the catalyst to the reaction zone.

6. A process for producing acetaldehyde which comprises continuously and simultaneously introducing acetylene, water and a catalyst solution containing a mercury compound and an oxidizing agent into a reaction zone maintained at a hydrolyzing reaction temperature, said temperature increasing from the catalyst solution inlet to the outlet of said zone; said catalyst being supplied in an amount substantially in excess of that required to promote the reaction and sufficient to prevent a temperature rise of said solution of more than about 10° C. during passage through said zone, substantially completely hydrolyzing the acetylene, continuously removing the hot catalyst solution and the reaction products from the reaction zone to a stripping zone, introducing an inert liquid azeotrope-former immiscible with the solvent portion of the catalyst solution, and in an amount sufficient to reduce the temperature of the solution, to vaporize the acetaldehyde and to dissolve organic by-products of the hydration reaction, said azeotrope-former being capable of forming an azeotrope with the solvent portion of the catalyst solution boiling below the temperature of the catalyst solution from the reaction zone and of dissolving organic by-products of the reaction; removing vapors containing water, azeotrope-former and acetaldehyde, recovering the acetaldehyde, recovering and recycling the azeotrope-former, removing catalyst solution and liquid azeotrope-former from the stripping zone to a separation zone, removing the liquid azeotrope-former and distilling it to separate it from said dissolved by-products, removing substantially clear catalyst solution from said separating zone, subjecting at least a portion of it to electrolytic oxidation and then recycling it to the reaction zone, removing solids containing mercury from the separating zone and returning said solids to the reaction zone.

7. A process for producing acetaldehyde which comprises continuously and simultaneously introducing acetylene and an aqueous catalyst solution containing mercury and an oxidizing agent into a reaction zone maintained at a hydrolyzing reaction temperature, said temperature increasing from the inlet to the outlet of said zone; the mixture thereby formed being passed concurrently through said zone, said catalyst being supplied in an amount substantially in excess of that required to promote the reaction and sufficient to prevent a temperature rise of said solution of more than about 10° C. during passage through said zone, substantially completely hydrolyzing the acetylene, continuously removing unreacted gases from said zone, continuously removing the hot catalyst and the reaction products to a stripping zone, introducing an inert, water-insoluble, liquid azeotrope-former into said zone at substantially the boiling temperature of its water azeotrope to cool the solution, to vaporize acetaldehyde and to dissolve organic by-products of the hydration reaction, said azeotrope-former being capable of forming an azeotrope with water boiling below the temperature of the catalyst solution from the reaction zone and of dissolving organic by-products of the reaction, subjecting the concurrently flowing stream thus produced to countercurrently flowing vapors of the azeotrope-former, removing vapors containing water, azeotrope-former and acetaldehyde, recovering the acetaldehyde, recovering and recycling the azeotrope-former, removing catalyst solution and liquid azeotrope-former from the stripping zone to a separation zone, removing the liquid azeotrope-former and distilling it to separate it from said dissolved by-products, returning the vapors to the stripping zone in countercurrent flow to the hot catalyst solution, removing catalyst solution from said separating zone, subjecting at least a portion of it to electrolytic oxidation and recycling it to the reaction zone, removing solids containing mercury from the separating zone and returning them to the reaction zone.

8. A process for producing acetaldehyde which comprises continuously and simultaneously introducing acetylene and an aqueous catalyst solution containing mercury and an oxidizing agent into a hydrolyzing reaction zone maintained at a reaction temperature below about 80° C., said temperature increasing from the inlet to the outlet of said zone; the mixture thereby formed being passed through said zone without substantial vaporization of acetaldehyde formed therein, said catalyst being supplied in an amount substantially in excess of that required to promote the reaction and sufficient to prevent a temperature rise of said solution of more than about 10° C. during passage through said zone, substantially completely hydrolyzing the acetylene, continuously removing unreacted gases from said zone, continuously removing the hot catalyst and the reaction products to a stripping zone, simultaneously and concurrently therewith passing an inert, water-insoluble, liquid azeotrope-former in which by-products of the reaction are soluble through said stripping zone, said azeotrope-former being capable of forming an azeotrope with water boiling below the temperature of the hot catalyst solution from the reaction zone and being introduced at the boiling point of said azeotrope, removing vapors containing water, azeotrope-former and acetaldehyde, recovering the acetaldehyde, recovering and recycling the azeotrope-former, removing catalyst solution and liquid azeotrope-former from the stripping zone to a separation zone, removing the liquid azeotrope-former therefrom and distilling it to separate it from said dissolved by-products, recycling vapors of the azeotrope-former countercurrent to the catalyst in the stripping zone, removing catalyst solution from said separating zone, subjecting at least a portion of it to electrolytic oxidation and recycling it to the reaction zone, removing solids containing mercury from the separating zone and returning them to the reaction zone.

9. A process which comprises simultaneously introducing acetylene and a catalyst solution into one end of a reaction zone, said solution being at a temperature of about 50 to 80° C., substantially completely hydrating the acetylene to acetaldehyde, the proportion of catalyst solution being substantially in excess of that required to promote the reaction and sufficient to prevent substantial vaporization in the reaction zone of acetaldehyde formed and to maintain the temperature at the outlet of said zone below the boiling point of the catalyst solution containing said acetaldehyde dissolved therein, the proportion of catalyst solution charged being the principal means of temperature control, removing the hot catalyst solution containing said acetaldehyde dissolved therein from the other end of said zone at a higher temperature than that of the catalyst solution charged but below the boiling point of said catalyst-aldehyde solution, introducing said hot solution into a stripping zone, removing the acetaldehyde therefrom by introducing an inert azeotrope-former being capable of forming an azeotrope with water boiling below the boiling point of said hot catalyst-aldehyde solution, said azeotrope-former being introduced at substantially the boiling point of said water azeotrope, removing the vapors thus formed, recovering the acetaldehyde, and regenerating the catalyst and returning it to the reaction zone.

MERLE RANDALL.

REFERENCES CITED

The following references are of record in the file of this patent:

UNITED STATES PATENTS

| Number | Name | Date |
|---|---|---|
| 1,676,735 | Keyes | July 10, 1928 |

FOREIGN PATENTS

| Number | Country | Date |
|---|---|---|
| 16,957 of 1941 | Great Britain | July 15, 1915 |
| 155,775 | Great Britain | Mar. 22, 1922 |
| 380,928 | Great Britain | Sept. 29, 1932 |

OTHER REFERENCES

Thorpe: "Dictionary of Applied Chemistry," 4th edition (1937), vol. 1, pages 16–19.